United States Patent
Singh et al.

(10) Patent No.: US 12,196,145 B2
(45) Date of Patent: Jan. 14, 2025

(54) ENGINE SPEED MANAGEMENT WITH INCREASED ELECTRICAL POWER SUPPLY

(71) Applicant: FCA US LLC, Auburn Hills, MI (US)

(72) Inventors: Manvinder Singh, Auburn, WA (US); Andrew White, Holly, MI (US); Ryan Masters, Whitmore Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/326,047

(22) Filed: May 31, 2023

(65) Prior Publication Data

US 2024/0401541 A1    Dec. 5, 2024

(51) Int. Cl.
*F02D 41/08* (2006.01)
*B60R 16/03* (2006.01)
*B60T 7/04* (2006.01)
*F02B 63/04* (2006.01)

(52) U.S. Cl.
CPC ............. *F02D 41/08* (2013.01); *B60R 16/03* (2013.01); *B60T 7/042* (2013.01); *F02B 63/042* (2013.01); *B60T 2220/04* (2013.01); *F02D 2200/602* (2013.01)

(58) Field of Classification Search
CPC ... F02D 41/08; F02D 2200/602; B60R 16/03; B60T 7/042; B60T 2220/04; F02B 63/042
See application file for complete search history.

(56) References Cited

U.S. PATENT DOCUMENTS

| | | | |
|---|---|---|---|
| 2002/0179347 A1* | 12/2002 | Tamai | B60W 10/06 180/65.25 |
| 2002/0179348 A1* | 12/2002 | Tamai | B60K 6/547 180/65.25 |
| 2003/0052486 A1* | 3/2003 | Doll | H02J 7/1476 290/40 C |
| 2004/0188163 A1* | 9/2004 | Yang | B62M 7/00 180/230 |
| 2007/0069521 A1* | 3/2007 | Jabaji | F02D 29/06 290/40 C |
| 2007/0228735 A1* | 10/2007 | Becker | H02P 29/0016 290/40 C |
| 2010/0073158 A1* | 3/2010 | Uesaka | B60Q 9/00 340/450.2 |

(Continued)

FOREIGN PATENT DOCUMENTS

| | | | | |
|---|---|---|---|---|
| WO | WO-0170533 A2 * | 9/2001 | | B60K 6/28 |
| WO | WO-2014157163 A1 * | 10/2014 | | B60T 13/146 |
| WO | WO-2018108467 A1 * | 6/2018 | | B60K 28/10 |

*Primary Examiner* — Joseph J Dallo
(74) *Attorney, Agent, or Firm* — Jeremy J. Klobucar

(57) ABSTRACT

A method of controlling an idle speed of an engine of a vehicle, includes the steps of determining that the engine is decelerating to or is operating at a nominal idle speed, determining that a vehicle brake is applied, determining an actual or projected electrical load of at least part of a vehicle electrical system is beyond an electrical load threshold, and increasing the engine speed to or maintaining the speed of the engine at a speed greater than the nominal idle speed range as a function of the electrical load to increase the electrical output of a generator coupled to the engine. The method may include determining that the brake is ceasing to be applied and then decreasing the engine speed to or toward the nominal idle speed.

18 Claims, 3 Drawing Sheets

(56) References Cited

U.S. PATENT DOCUMENTS

| | | | |
|---|---|---|---|
| 2010/0174460 A1* | 7/2010 | Gibson | B60W 10/026 |
| | | | 701/112 |
| 2015/0105974 A1* | 4/2015 | Kleve | B60W 10/18 |
| | | | 701/36 |
| 2015/0115903 A1* | 4/2015 | Katsurada | H02J 7/04 |
| | | | 322/24 |
| 2020/0165987 A1* | 5/2020 | Cunningham | B60W 20/00 |

* cited by examiner

ENGINE SPEED MANAGEMENT WITH INCREASED ELECTRICAL POWER SUPPLY

FIELD

The present disclosure relates to an engine speed management system that provides an increased electrical power supply in certain circumstances.

BACKGROUND

Engine driven electrical generators or alternators are used to supply electricity to various components and systems in a vehicle. At low engine speeds, the alternator produces less power than when the engine speed is higher. At times, the electrical demand in the vehicle can be higher than the output from the alternator and it may be desirable at certain times to provide a higher electrical output form the alternator.

SUMMARY

In at least some implementations, a method of controlling an idle speed of an engine of a vehicle, includes the steps of:
determining that the engine is decelerating to or is operating at a nominal idle speed;
determining that a brake of the vehicle is applied;
determining an actual electrical load of at least part of a vehicle electrical system or a projected electrical load of at least part of the vehicle electrical system is beyond an electrical load threshold; and
increasing the speed of the engine to or maintaining the speed of the engine at a speed greater than the nominal idle speed range as a function of the actual electrical load of the vehicle electrical system or a projected electrical load of the vehicle electrical system to increase the electrical output of a generator coupled to the engine.

In at least some implementations, the step of determining that the brake is ceasing to be applied and decreasing the engine speed to or toward the nominal idle speed. In at least some implementations, the step of determining that the brake is ceasing to be applied is accomplished by a controller that is communicated with a brake sensor. In at least some implementations, the brake sensor is responsive to changes in the position of a pedal that is actuated to apply the brake, or to changes in the amount of force applied to a pedal that is actuated to apply the brake, or to changes in the total force applied by the brake on the vehicle.

In at least some implementations, the speed greater than the nominal idle speed varies as a function of the magnitude by which the determined electrical load exceeds the electrical load threshold. In at least some implementations, the speed greater than the nominal idle speed varies as a function of the output of the brake sensor.

In at least some implementations, a vehicle includes an engine, a brake, a brake sensor, a generator and a control system. The engine is arranged to propel the vehicle and having a nominal idle speed at which the engine operates when idling. The brake is arranged to slow the speed of the vehicle and stop the vehicle. The brake sensor is associated with the brake and providing an output indicative of an application of the brake. The generator is driven by the engine to produce an output of electricity, and has a first level of electrical output when the engine is operating at the nominal idle speed and a second level of electrical output that is greater than the first level when the engine is operating at a speed greater than the nominal idle speed. The generator is coupled to a vehicle electrical system to provide power to components of the vehicle electrical system. The control system is coupled to the engine and communicated with the brake sensor and the vehicle electrical system. The control system increases the speed of the engine to a speed above the nominal idle speed when the brake is applied, the engine is idling or operating at a speed approaching the nominal idle speed and an electrical load demand on at least some components of the vehicle electrical system is greater than a threshold. The control system decreases the speed of the engine from the speed above the nominal idle speed range to or toward the nominal idle speed range when the output of the brake sensor indicates that the brake is being released.

In at least some implementations, the threshold is set as a function of the first level of electrical output of the generator.

In at least some implementations, the brake sensor is responsive to changes in the position of a pedal coupled to the brake, or to changes in the total force applied by the brake on the vehicle, or to changes in the amount of force applied to a pedal actuated to apply the brake, or to changes in the amount of force applied by an actuator that is actuated to apply the brake.

In at least some implementations, the engine is a combustion engine and the idle speed of the engine is adjusted by one or more of changing a position of a throttle, changing a fuel supply to the engine or changing the timing of ignition events in the engine.

In at least some implementations, the vehicle electrical system includes an electrical sensor having an output indicative of the load of at least one of the components of the electrical system. In at least some implementations, the control system includes a controller that determines the electrical load demand as a function of the output of the electrical sensor and a predetermined load for components of the electrical system not communicated with the electrical sensor.

In at least some implementations, the vehicle also includes a vehicle speed sensor and wherein the engine speed is increased when the vehicle speed is zero.

An increase in the electrical output of an engine-driven electrical generator can be achieved in certain instances where the electrical demand is higher than a threshold, and may be higher than an output of the electrical generator associated with a given engine speed. Further, when a vehicle brake is being released and the engine speed is higher than a nominal idle speed, a reduction in the engine speed may be achieved prior to full release of the brake or brake assembly to reduce the magnitude of a torque from the engine when the brake is fully released. This reduces or eliminates a jerking or lurching of the vehicle and provides a better passenger experience in use of the vehicle.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
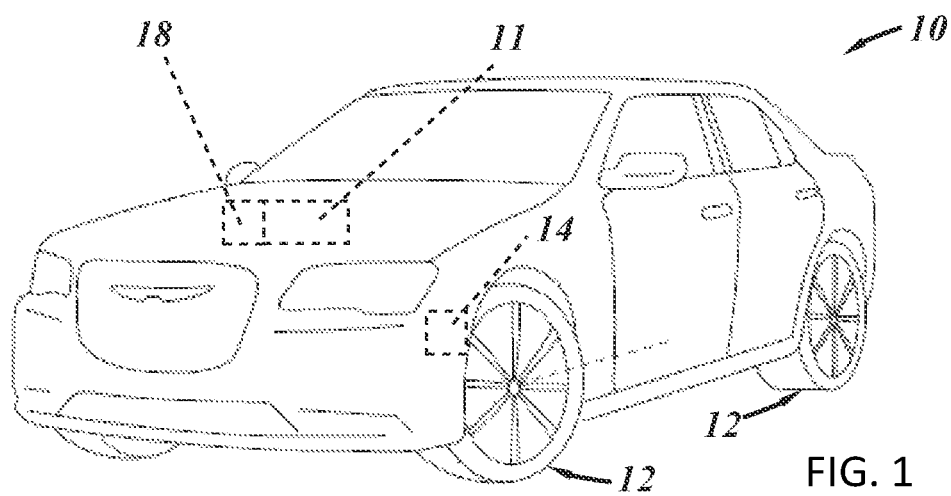
FIG. 1 is a perspective view of a vehicle.

Referring in more detail to the drawings, FIG. 1 illustrates a vehicle 10 that has an engine 11 coupled to one or more wheels 12 to drive the wheels 12 and move the vehicle 10. The vehicle 10 includes one or more brake assemblies 14 associated with the wheels 12 to enable a driver or system to reduce the speed of the vehicle and stop the vehicle, and retain the vehicle stopped, when desired. Various vehicle systems and accessories are provided with electrical power by an electrical system 16 that may include one or more batteries, and an electrical generator 18 driven by the engine 11 when the engine 11 is operating. To control operation of various vehicle systems and accessories, a vehicle control system 20 may be coupled to the electrical system 16 and to the vehicle systems and accessories.

The engine 11 may be an internal combustion engine, or it could be an electric motor or the like. The generator 18 may have an input that is coupled to a rotating output of the engine 11 by a power transmission member, like a belt or chain, so that rotation of the input generates electricity that can be used to power various things in the vehicle 10. The generator 18 may be an alternator commonly provided in vehicles. So arranged, the engine 11 drives the vehicle wheels 12 to move the vehicle 10, and also drives the generator 18 to produce electricity used in operation of the vehicle systems and accessories.

The vehicle electrical system 16 may receive electrical power from one or both of the battery and the generator 18, and may provide power to various devices. Examples of devices include audio-visual devices in the vehicle, heating and cooling devices (e.g. HVAC system, seat heaters or coolers), electric motors (e.g. to move mirrors, seats, etc.), pumps, electrical outputs to charge batteries of remote devices (e.g. mobile phones), and the like. Further, the vehicle 10 may have electrical outlets via which accessories may be plugged into the vehicle 10 and powered by the electrical system 16.

The brake assemblies 14 may be of any suitable type, for example, a disc or drum type brake assembly, and may include a brake actuator, which may be a pedal, that is coupled to a brake member. The brake member (e.g. a brake pad or drum shoe) is associated with a vehicle wheel 12 and arranged to frictionally engage and slow or inhibit rotation of a vehicle wheel 12.

The control system 20 may include one or more controllers 22, and the controllers 22 may be coupled in any desired way and arrangement to the engine 11, generator 18, electrical system 16 and other vehicle 10 components. In order to perform the functions and desired processing set forth herein, as well as the computations therefore, the controllers 22 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, a controller 22 may include input signal processing and filtering to enable accurate sampling and conversion or acquisitions of such signals from communications interfaces and sensors.

As used herein the terms control system 20 or controller 22 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
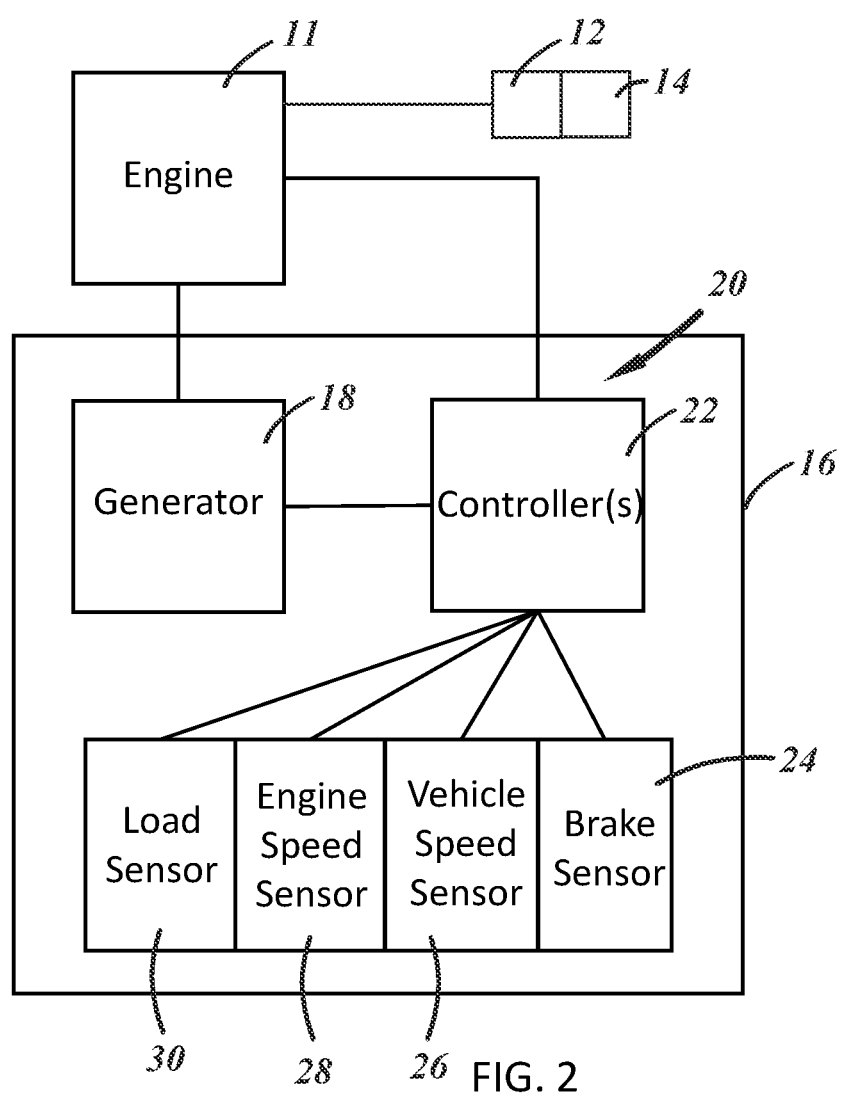
FIG. 2 is a diagrammatic view of vehicle components.

As shown in FIG. 2, the electrical system 16 and control system 20 may include or be communicated with various sensors, such as a brake sensor 24, vehicle speed sensor 26, engine speed sensor 28 and an electrical sensor 30, by way of non-limiting examples. The brake sensor 24 is associated with the brake assembly 14 and provides an output to the control system 20 that is indicative of some actuation or state of the brake assembly 14. For example, the brake sensor 24 may be responsive to the position (or change thereof) or motion of part of the brake assembly 14, like a caliper or the brake actuator (e.g. pedal). The brake sensor 24 could be responsive to a brake fluid pressure within the system, or the braking force applied by or to the brake member or brake actuator. Actuation of the brake assembly 14 slows the vehicle 10 and can cause other functions to occur, such as illumination of brake lights and disengagement of a throttle control system (e.g. cruise control).

The vehicle speed sensor 26 can be used to determine a rate of speed and a rate of change of vehicle speed, and whether the vehicle speed is increasing or decreasing. The control system 20 may be communicated with the vehicle speed sensor 26 and may provide a display of vehicle speed within the vehicle 10, may use the vehicle speed sensor output to control a cruise control system, and for other functions. The speed sensor output may also be used to determine when a vehicle 10 is stopped or coming to a stop.

The control system 20 may also include one or more electrical sensors 30 by which the electrical load or demand of at least part of the electrical system 16 can be determined, where such determination may be an estimation. The control system 20 can utilize information/output from the electrical sensor(s) 30 to limit total electrical demand in the vehicle 10 in view of electrical power available in the vehicle 10, to prevent damage to a system or component, or otherwise as desired. The electrical sensors 30 could be discrete components, or various electrical components can be communicated with one or more controllers 22 of the control system 20 and provide signals or information indicative of their current draw or electrical power use, which signals or information can be used by the control system 20 to determine the electrical load of all or part of the electrical system 16, and the electrical sensor(s) can be considered to be the outputs/inputs that provide such information.

In use of the vehicle 10, the electrical demand of things within the electrical system 16 can vary. For example, the heating and cooling systems and components can be operated at different output levels that have different electrical requirements. Further, other components like coolant fluid pumps and fuel pump motors, may have variable output and variable electrical loads. Display screens, audio equipment, lights and other things may be on or off, or operated at varying outputs, and thus, have variable electrical loads.

The electrical generator 18 may have an electrical output that varies as a function of the engine rotary speed, with an electrical output at lower engine speeds being less than the electrical output at higher engine speeds. An engine 11 may be designed to idle at a nominal idle speed which represents an intended lowest rotary speed of the engine 11 which may occur without throttle input by the driver of the vehicle 10. The electrical generator 18 is driven by the engine 11 and has its lowest electrical output when the engine 11 is at idle speed. Suitable rotary speed control may be achieved with pulleys or gears of varying sizes to provide a rotary speed of the electrical generator 18 that achieves a desired electrical output. For example, a nominal idle speed of an engine 11 may be about 600 to 1,000 rpm, and the electrical generator 18 may have a rotary speed that is 1.5 to 4.5 greater when the engine 11 is operating at the nominal idle speed.

In at least some situations, when the electrical generator 18 is driven at a low speed, a high electrical power demand in the vehicle electrical system 16 might exceed the power output by the electrical generator 18. In such a situation, there would be insufficient electrical power to fully power all components or systems that are drawing current in the electrical system 16.

One way to deal with this problem is to manage the current flow based upon a predetermined priority so that more important or higher priority components for a given state of engine/vehicle operation receive the electric current/electrical power they need and lower priority components receive less than demanded or no current/electrical power. Another way to deal with this problem is to increase the rotary speed of the electrical generator 18, by increasing the engine rotary speed, to thereby increase the power output from the electrical generator 18. And a combination of these two ways to deal with the problem may be used, as desired. That is, the electrical output of the generator 18 may be increased by increasing the engine speed, and a reduction or other control of power provided to at least certain components may be employed.

Figure 5:
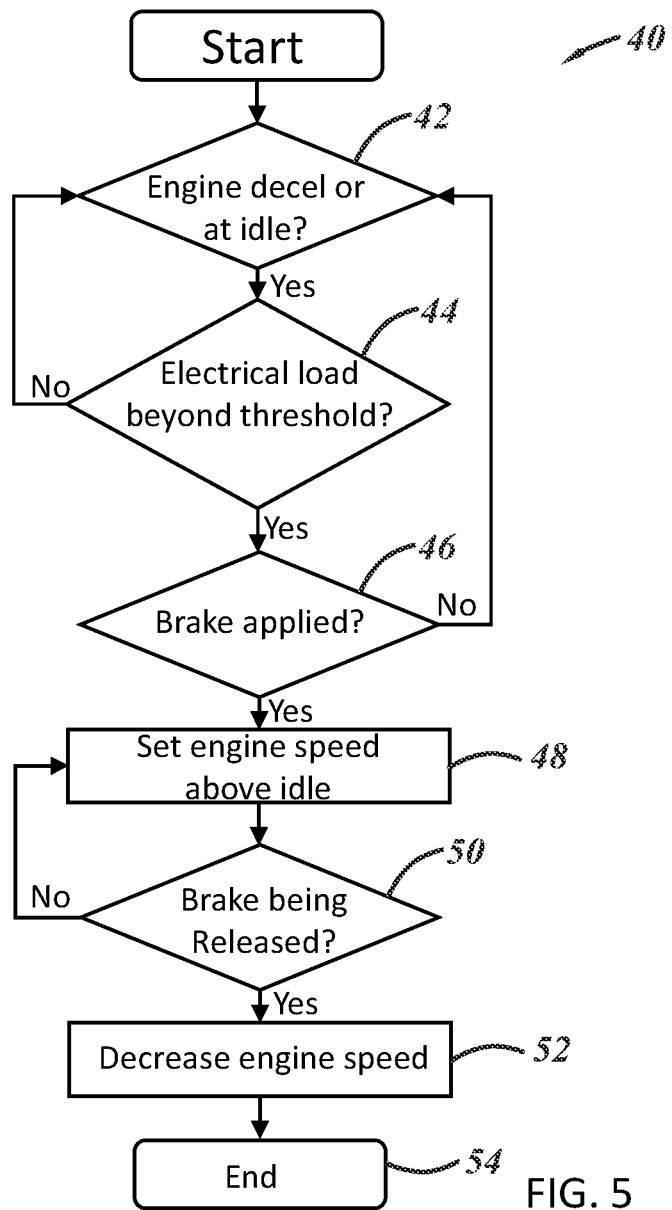
FIG. 5 is a flowchart of a method of controlling engine speed as a function of electrical load in an electrical system of the vehicle.

One implementation of a method 40 of controlling operation of the engine 11, and hence, the electrical generator 18, is shown in FIG. 5. The method may start at step 42 when it is determined that the engine 11 is idling, and when that is determined, the method may continue to step 44 in which it is determined if an actual or projected electrical load in or of the electrical system 16 is beyond a threshold. If the electrical load is beyond the threshold, the method may continue to step 46 and determine if the brake 14 is applied, and if it is, the method may proceed to step 48. In step 48, the engine speed may be set to a target speed greater than the idle speed of the engine 11, this increases the speed at which the electrical generator 18 is driven and thus, increases the electrical output of the electrical generator 18.

In this method, the increased engine speed may be maintained until it is determined, in step 50, that the vehicle brake 14 is being released which indicates that the driver is intending to move the vehicle 10. When it is determined that the vehicle brake 14 is being released, the method proceeds to step 52 in which the engine speed is reduced from the speed set in step 48 and to or toward the engine idle speed, and thereafter, the method ends at 54.

Reducing the engine speed to or toward the engine idle speed reduces the torque of the engine 11 that is input to the vehicle 10 when the vehicle brake 14 is fully released and forward (or rearward) travel of the vehicle 10 is initiated, to provide a smoother acceleration response of the vehicle 10. If the brake 14 were fully released when the engine 11 was still being operated at the higher than idle engine speed, a greater initial torque would be applied to the vehicle 10 causing the vehicle 10 to accelerate more rapidly, and/or provide an impulse or jerking motion to the vehicle 10 that would, undesirably, be experienced by passengers in the vehicle 10. Reducing the engine speed does reduce the rotary speed of the electrical generator 18 and thereby reduces the electrical output of the generator 18, but this reduction in generator 18 output is temporary and upon acceleration of the engine 11 by the driver to move the vehicle 10, the speed of the generator 18 and its electrical output are soon increased. Thus, an associated reduction in power provided to one or more electrical components is temporary.

Thus, the electrical generator 18 may have a first power output at a rotary speed of the electrical generator 18 associated with nominal idle engine operation, and the electrical generator 18 may have additional power output levels including a second power output that is higher than the first power output and which is associated with an engine rotary speed greater than idle, when the rotary speed of the electrical generator 18 is higher. In at least some implementations, the generator produces power at a certain voltage or within a smaller range of voltages, for example at 12 to 15 volts, and the power output variance is a difference in the maximum current that can be provided by the generator 18.

The method may include more or fewer steps, and the steps of the method may be implemented in different ways. For example, the determination in step 42 that the engine 11 is idling may be accomplished by determining that the vehicle speed is zero, which information may be provided by the vehicle speed sensor 26. Additionally, an engine speed sensor 28, sometimes called a tachometer may provide information to the control system 20 that the engine rotary speed is below a threshold associated with the engine 11 idling, where the engine idle speed may vary within a known or assumed range in operation of the engine 11. The threshold may be higher than the nominal idle speed, with a non-limiting example threshold being 100 rpm higher than the nominal idle speed. Moreover, any combination of vehicle speed sensor(s), engine speed sensor(s) and acceleration pedal position sensor(s) may provide information to the control system that the engine is idling.

In at least some implementations, the vehicle speed may be monitored and when the vehicle speed is decreasing and is below a threshold, the method 40 may either increase the engine rotary speed to the target speed, or if the engine speed is at or greater than the target speed, the method may prevent the engine speed from decreasing below the target speed as the vehicle speed decreases to zero. In this way, the engine speed can be at the target speed when the vehicle 10 comes to a stop, and the method need not wait for the vehicle speed to be zero before setting the engine speed to the great than idle target speed. The method/system may also check to determine that the brake 14 is being applied as the vehicle speed is decreasing, if desired.

Next, the determination of the electrical load can be done in different ways. For example, the combined current draw of each component of the system can be determined by one or more controllers 22 and summed up to provide an actual electrical load, or the electrical load may be estimated. The load may be estimated, for example, by using predetermined or assumed values for different components, where those values may be stored in a look-up table or map as a fixed value or a changing value (e.g. low, medium and high values for different levels of operation and demand). In such a method or system, when use of a component is determined, a predetermined electrical load value is used in a summation of electrical loads, without having to determine the actual, instantaneous load of that component. This may be done for any number of components, up to all of them, or for a few components, such as those that have a high current draw, at least at maximum operation, like the air conditioner, seat heaters or coolers, or auxiliary components that may be plugged into an electrical outlet in the vehicle 10.

In one example, the necessary electrical components in the electrical system 16, which are those needed for operation of the vehicle 10, such as controllers 22, fuel pump, coolant pumps and the like, may collectively be assigned one or more predetermined electrical loads (a single value or values depending upon levels or thresholds of operation/demand). In other words, the load of multiple components may be combined into a single value in a given analysis of electrical load, and the load of other components may be added to this value to give an estimated total electrical load in step 44.

The target engine speed may be a single value or a range of values which may, for example, be dependent upon the determined electrical load to be met by the electrical generator 18. By way of non-limiting examples, the target engine speed may be a set value, perhaps 1,000 rpm or within a range of 900 rpm to 1,200 rpm, or perhaps 300 rpm greater than the nominal idle speed or within a range of 200 rpm to 400 rpm greater than the nominal idle speed. The target engine speed could be a variable target engine speed that is determined as a function of the determined electrical load, where a higher determined electrical load results in a higher target engine speed, and vice versa, to provide an electrical output from the generator 18 that matches more closely the instantaneous electrical power needed in the electrical system 16. The engine speed may be increased or maintained at the target engine speed by any suitable means, including but not limited to increasing throttle, or changing fuel supply or ignition timing in the engine 11, or some combination of two or more of these.

The target engine speed could be determined as a function of the brake force applied, where a determination that the braking force is not sufficient to hold the vehicle 10 stopped at a higher target engine speed would result in setting the target engine speed lower to ensure the vehicle 10 remains stopped at the target engine speed used. This could be based upon a maximum braking force for a vehicle 10 and other factors related to braking force, like the inclination of the vehicle 10, where a vehicle 10 facing uphill may permit higher target engine speed than a vehicle 10 facing downhill because of the increased braking force needed to hold a downhill facing vehicle 10 stopped. A determined target engine speed could be reduced if vehicle movement is detected, such as may be determined from the output of the vehicle speed sensor 26.

The step of determining that the brake 14 is being released may be accomplished with feedback from the brake sensor 24. To enable a smoother acceleration of the vehicle 10 without a high torque impulse caused by the engine 11 operating at the target engine speed, it is desirable to reduce the engine speed before the brake 14 is fully released. Accordingly, the brake sensor 24 can provide feedback to the controller 22 for determination of when the brake 14 is being released. This determination may be made based upon a detected change in the brake assembly 14. For example, the magnitude (i.e. amount) or rate of movement of the brake pedal/actuator may be determined by a brake position sensor that may be associated with the brake pedal/actuator, or by a reduction in fluid pressure in the brake assembly 14 (e.g. hydraulic brake fluid) if such information is available in or to the control system 20. Typical brake pedal release rates can vary anywhere from 10%/s to 1000%/s. Typical brake pedal position movements can vary anywhere from 10 mm to greater than 200 mm in different applications.

When it is determined that the brake 14 is being released, and preferably before the brake 14 is fully released, the engine speed may be decreased to or toward the nominal idle speed by any suitable means, including but not limited to decreasing throttle, or changing fuel supply or ignition timing in the engine 11, or some combination of two or more of these. Then, when the brake 14 is fully released, the torque input from the engine 11 is reduced compared to what it would have been at the target engine speed, and this permits a lower torque impulse and a smoother acceleration of the vehicle 10.

Figure 3:
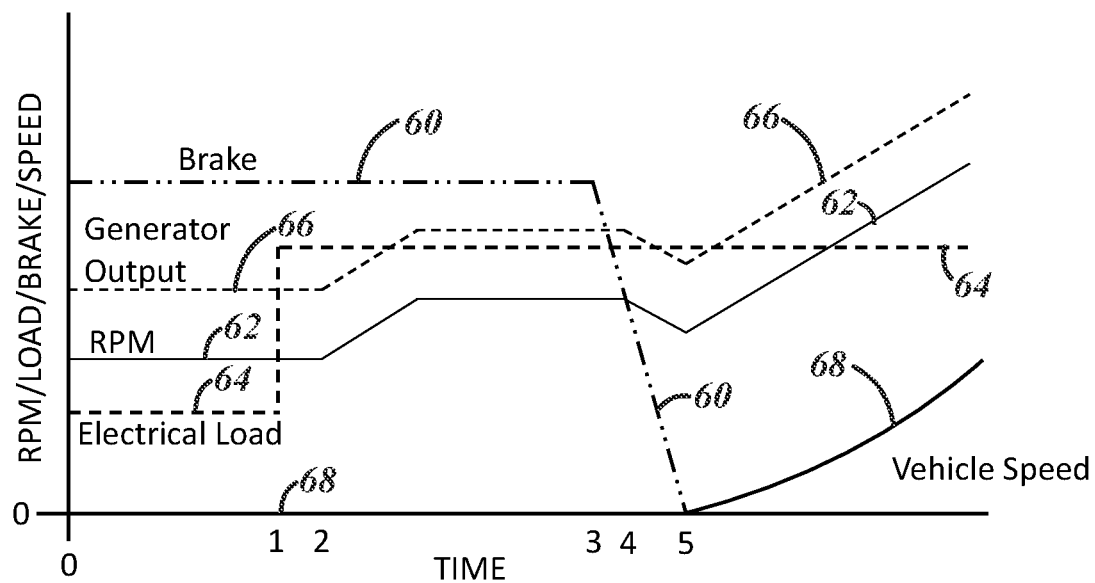
FIG. 3 is a graph of various vehicle parameters over time.

FIG. 3 illustrates an example of the method described herein. In FIG. 3, at time zero (0), the vehicle brake assembly 14 is applied, as shown by line 60, the engine 11 is initially at a nominal idle speed, as shown by line 62, the electrical load is at a first level, as shown by line 64, the electrical load is less than the generator 18 output at engine idle speed, as shown by line 66, and the vehicle speed is zero (0) as shown by line 68 which is coincident with the horizontal axis of the graph when the vehicle speed is zero. At time (1), the electrical load increases to a higher, second level, as shown by the change in line 64, and the second level in this example is greater than an electrical load threshold, and may be greater than the electrical output 66 of the generator 18 when the engine 11 is at the nominal idle speed. As a result of the increased electrical load 64, at time (2) the engine speed 62 is increased to the target engine speed, and this increases the electrical output 66 of the generator 18 to a second level which, in this example, is greater than the second level of electrical load 64.

Next, at time (3), the brake 60 is starting to be released and after a threshold release/movement of the brake 14, the engine speed 62 is decreased beginning at time (4) and ending at time (5), and at or soon after time (5), the engine speed 62 is increased by a user moving a throttle input (e.g. accelerator pedal), and the vehicle speed 68 increases accordingly, as does the electrical output 66 of the generator 18.

Figure 4:
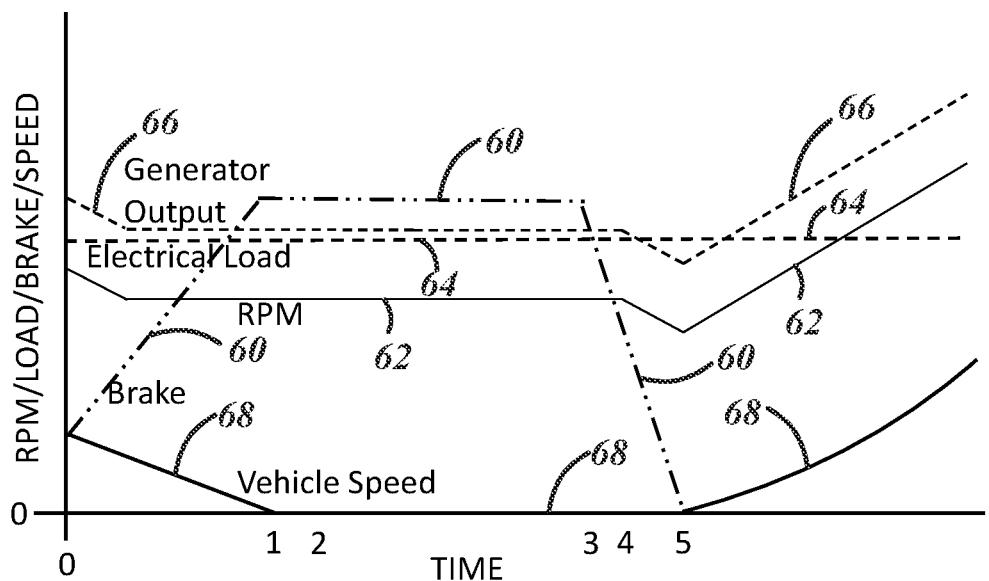
FIG. 4 is a graph of various vehicle parameters over time.

FIG. 4 is a graph similar to FIG. 3. In this example, the vehicle speed 68 is decreasing to zero between time (0) and time (1), as the brake 60 is applied. As the engine speed 62 is decreasing toward the nominal idle speed, the electrical load 64 is determined to be higher than the electrical load threshold (which may be an electrical load that is or is a function of the output of the generator 18 when the engine is at its nominal idle speed), so the engine speed 62 is prevented from decreasing below the target engine speed, which keeps the electrical output 66 of the generator 18 at the second level, which in this example is higher than the electrical load 64. The process from time (3) to time (5) and beyond may be the same as described with reference to FIG. 3.

Accordingly, an increase in the electrical output of an engine-driven electrical generator can be achieved in certain instances where the electrical demand is higher than a threshold, and may be higher than an output of the electrical generator associated with a given engine speed. Further, when a vehicle brake is being released and the engine speed is higher than a nominal idle speed, a reduction in the engine speed may be achieved prior to full release of the brake or brake assembly to reduce the magnitude of a torque from the engine when the brake is fully released. This reduces or eliminates a jerking or lurching of the vehicle and provides a better passenger experience in use of the vehicle.

What is claimed is:

1. A method of controlling an idle speed of an engine of a vehicle, comprising the steps of:
   determining that the engine is decelerating to or is operating at a nominal idle speed;
   determining that a brake of the vehicle is applied;

determining an actual electrical load of at least part of a vehicle electrical system or a projected electrical load of at least part of the vehicle electrical system is beyond an electrical load threshold; and increasing the speed of the engine to or maintaining the speed of the engine at a speed greater than the nominal idle speed range as a function of the actual electrical load of the vehicle electrical system or a projected electrical load of the vehicle electrical system to increase the electrical output of a generator coupled to the engine.

2. The method of claim 1, including the step of determining that the brake is ceasing to be applied and decreasing the engine speed to or toward the nominal idle speed.

3. The method of claim 2, wherein the step of determining that the brake is ceasing to be applied is accomplished by a controller that is communicated with a brake sensor.

4. The method of claim 3, wherein the brake sensor is responsive to changes in the position of a pedal that is actuated to apply the brake.

5. The method of claim 3, wherein the brake sensor is responsive to changes in the amount of force applied to a pedal that is actuated to apply the brake.

6. The method of claim 3, wherein the brake sensor is responsive to changes in the total force applied by the brake on the vehicle.

7. The method of claim 1, wherein the speed greater than the nominal idle speed varies as a function of the magnitude by which the determined electrical load exceeds the electrical load threshold.

8. The method of claim 3, wherein the speed greater than the nominal idle speed varies as a function of the output of the brake sensor.

9. A vehicle, comprising:
an engine arranged to propel the vehicle and having a nominal idle speed at which the engine operates when idling;
a brake arranged to slow the speed of the vehicle and stop the vehicle;
a brake sensor associated with the brake and providing an output indicative of an application of the brake;
a generator driven by the engine to produce an output of electricity, the generator has a first level of electrical output when the engine is operating at the nominal idle speed and a second level of electrical output that is greater than the first level when the engine is operating at a speed greater than the nominal idle speed, the generator being coupled to a vehicle electrical system to provide power to components of the vehicle electrical system;
a control system coupled to the engine and communicated with the brake sensor and the vehicle electrical system, wherein the control system increases the speed of the engine to a speed above the nominal idle speed when the brake is applied, the engine is idling or operating at a speed approaching the nominal idle speed and an electrical load demand on at least some components of the vehicle electrical system is greater than a threshold, and wherein the control system decreases the speed of the engine from the speed above the nominal idle speed range to or toward the nominal idle speed range when the output of the brake sensor indicates that the brake is being released.

10. The system of claim 9, wherein the threshold is set as a function of the first level of electrical output of the generator.

11. The system of claim 9, wherein the brake sensor is responsive to changes in the position of a pedal coupled to the brake.

12. The system of claim 9, wherein the brake sensor is responsive to changes in the total force applied by the brake on the vehicle.

13. The system of claim 9, wherein the brake sensor is responsive to changes in the amount of force applied to a pedal actuated to apply the brake.

14. The system of claim 9, wherein the brake sensor is responsive to changes in the amount of force applied by an actuator that is actuated to apply the brake.

15. The system of claim 9, wherein the engine is a combustion engine and the idle speed of the engine is adjusted by one or more of changing a position of a throttle, changing a fuel supply to the engine or changing the timing of ignition events in the engine.

16. The system of claim 9, wherein the vehicle electrical system includes an electrical sensor having an output indicative of the load of at least one of the components of the electrical system.

17. The system of claim 16, wherein the control system includes a controller that determines the electrical load demand as a function of the output of the electrical sensor and a predetermined load for components of the electrical system not communicated with the electrical sensor.

18. The system of claim 9, which also includes a vehicle speed sensor and wherein the engine speed is increased when the vehicle speed is zero.

* * * * *